W. T. HUFF.
Cotton-Planters.

No. 151,029. Patented May 19, 1874.

WITNESSES.
E. Wolff
Chadwick

INVENTOR.
W. T. Huff
BY
ATTORNEYS.

UNITED STATES PATENT OFFICE.

WILLIAM T. HUFF, OF ATLANTA, GEORGIA.

IMPROVEMENT IN COTTON-PLANTERS.

Specification forming part of Letters Patent No. 151,029, dated May 19, 1874; application filed February 28, 1874.

*To all whom it may concern:*

Figure 1:
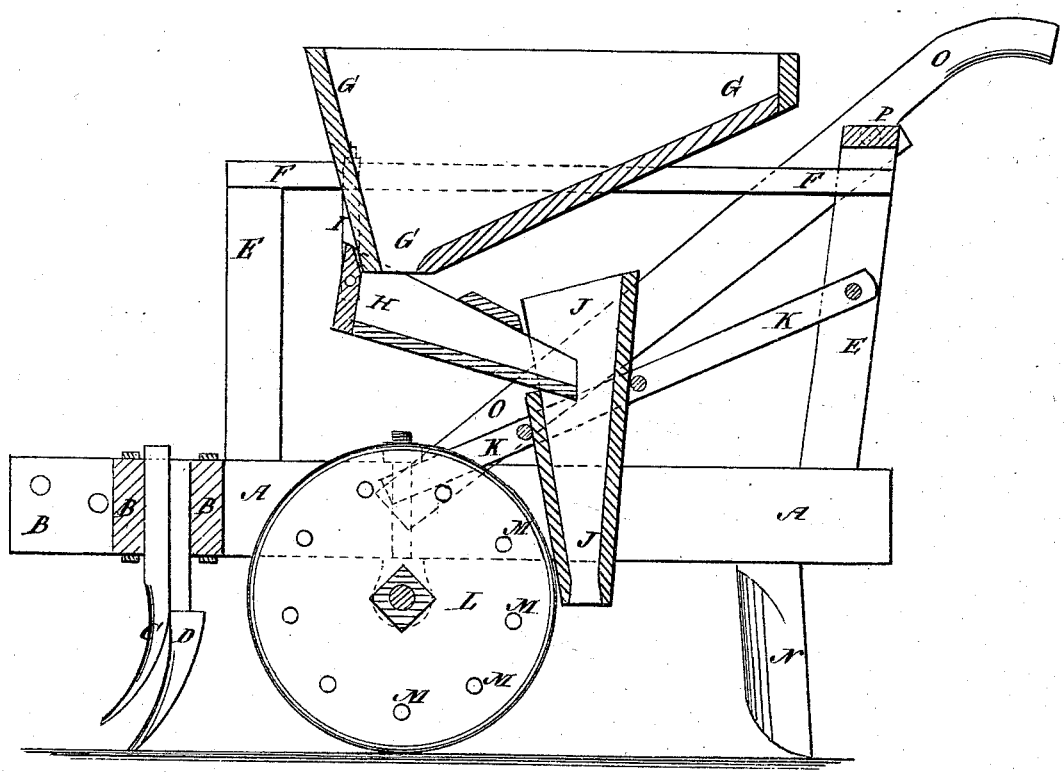
Figure 2:
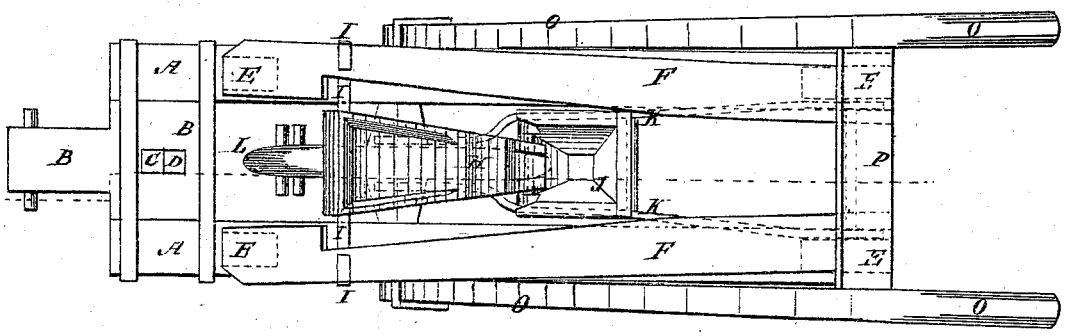

Be it known that I, WILLIAM T. HUFF, of Atlanta, in the county of Fulton and State of Georgia, have invented a new and useful Improvement in Cotton-Planter, of which the following is a specification:

Figure 1 is a vertical longitudinal section of my improved planter, taken through the line *x x*, Fig. 2. Fig. 2 is a top view of the same, the hopper being removed.

Similar letters of reference indicate corresponding parts.

The invention will first be fully described, and then pointed out in the claim.

A are the side bars or beams of the frame, to and between the forward ends of which is secured the bar or block B, to the projecting forward end of which the draft is applied. In the rear part of the bar B is formed a mortise, in which are secured the shank of the plow C, by which the furrow is opened, and of the opener D, by which the sides of the furrow opened by the plow C are pressed back and packed, so that the soil will not fall in and partially fill said furrow before the seed is deposited in it. To the front and rear ends of the side bars A are attached the uprights E, the upper ends of each side pair of which are connected by a bar, F. Upon the bars F rest the hopper G, in which the seed is placed. The hopper G is made long and narrow, and its bottom inclines forward from its rear end nearly to its forward end, a small space being left for the seed to drop through into the shoe H, the forward end of which is supported by two straps, I, the lower ends of which are attached to the opposite sides of the said forward end of the shoe H, and their upper parts are hooked upon pins attached to the side bars F, that support the hopper G, several holes being formed in the said straps to receive the said pins, so that the forward end of the shoe H may be raised or lowered, to give it a greater or less inclination, according as more or less seed is required to be dropped. The rear and lower end of the shoe H rests in a notch in the upper part of the forward side of the spout J, which passes down between, is secured to, and supported by the bars K, the rear ends of which are pivoted to the upper part of the rear uprights E. The bars K rest in inclined grooves in the sides of the spout J, and are clamped to said spout by two bolts passing through them at the front and rear side of said spout. The bars K, a little forward of the spout J, are bent inward and forward, so that their forward ends may be upon and close to the opposite sides of the upper part of the wheel L, and may rest upon the transverse pins M, which are passed through the said wheel L at a little distance from its rim. By this construction, as the wheel L revolves, the ends of the bars K drop from one pin M to another, which jars the spout J and shoe H, and causes the seed to pass out regularly. The rim of the wheel L is rounded off, or made V-shaped, so as to roll along the open furrow without filling it with soil, and its journals revolve in bearings attached to the side beams A. The sides of the furrow are forced in to cover the seed by the covering-plows N, the shanks of which are attached to the rear parts of the side beams A. O are the handles, the forward ends of which are attached to the sides of the forward parts of the side beams A, and their rear parts are held at the proper distance apart by the cross-bar P, the ends of which are attached to said handles, and which is also attached to the upper ends of the rear uprights E, to support the handles at the proper elevation.

Having thus described my invention, I claim as new and desire to secure by Letters Patent—

The combination of dropper-spout J with pivoted rods K K and shaker H, the spout being placed loosely between cross-bars of rods K, and receiving the end of shaker in an opening at its front, as and for the purpose specified.

WILLIAM T. HUFF.

Witnesses:
H. H. VENABLE,
G. H. CULBERSON.